United States Patent [19]

Itskovich et al.

[11] Patent Number: 5,764,058
[45] Date of Patent: Jun. 9, 1998

[54] SIGNAL PROCESSING METHOD FOR DETERMINING THE NUMBER OF EXPONENTIAL DECAY PARAMETERS IN MULTIEXPONENTIALLY DECAYING SIGNALS AND ITS APPLICATION TO NUCLEAR MAGNETIC RESONANCE WELL LOGGING

[75] Inventors: Gregory B. Itskovich, Houston, Tex.; Alexander Roytvarf, Rishon-Le-Zion, Israel

[73] Assignee: Western Atlas International, Inc., Houston, Tex.

[21] Appl. No.: 721,569

[22] Filed: Sep. 26, 1996

[51] Int. Cl.$^6$ .................................................. G01V 3/00
[52] U.S. Cl. ...................................... 324/303; 324/309
[58] Field of Search ............................. 324/303, 300, 324/307, 309, 314, 312, 318, 322; 128/653.2, 653.5

[56] References Cited

U.S. PATENT DOCUMENTS

| | | | |
|---|---|---|---|
| 5,517,115 | 5/1996 | Prammer | 324/303 |
| 5,565,775 | 10/1996 | Stallmach et al. | 324/303 |
| 5,585,720 | 12/1996 | Edwards | 324/309 |
| 5,696,448 | 12/1997 | Coates et al. | 324/303 |

*Primary Examiner*—Louis M. Arana
*Attorney, Agent, or Firm*—Richard A. Fagin

[57] ABSTRACT

A method of determining the number of exponential decay modes in spin echo amplitude signals from a nuclear magnetic resonance well logging instrument. The method includes dividing the time interval between initiation and termination of measurement of the spin echo amplitude signals into 2r−1 equal length segments, where r is a positive integer. Integrals of the spin echo amplitude signals with respect to time in each of the segments are calculated. Best fit functions are calculated for the spin echo amplitude signals, and integrals with respect to time of apparent amplitudes of the best fit functions at each time corresponding to a time at which the spin echo amplitude signals were generated. The integrals of the spin echo amplitude signals and the integrals of the apparent amplitudes from each segment are arranged into symmetric matrices each having dimensions r×r. A norm and a standard deviation of the matrix of the spin echo amplitude integrals is calculated. If the norm of the determinant of the matrix of the integrals of the spin echo amplitude signals is less than or equal to a selected confidence factor multiplied by the standard deviation of the determinant of the matrix of the integrals of the spin echo amplitude signals, then the number of exponential decay modes in the spin echo amplitude is equal to r−1. If the inequality is not satisfied, r is increased by one and the process is repeated.

8 Claims, 5 Drawing Sheets

SIGNAL PROCESSING METHOD FOR DETERMINING THE NUMBER OF EXPONENTIAL DECAY PARAMETERS IN MULTIEXPONENTIALLY DECAYING SIGNALS AND ITS APPLICATION TO NUCLEAR MAGNETIC RESONANCE WELL LOGGING

BACKGROUND OF THE INVENTION

Field of the Invention

The invention is related to the field of signal processing methods for nuclear magnetic resonance (NMR) well logging tools. More specifically, the invention is related to signal processing methods for determining the relaxation spectrum of NMR spin-echo amplitude decay measurement.

Description of the Related Art

Nuclear magnetic resonance (NMR) well logging instruments can be used for determining, among other things, the fractional volume of pore space, the fractional volume of mobile fluid filling the pore space of earth formations, and the distribution of pore space sizes on the earth formations. NMR well logging apparatus are described, for example, in U.S. Pat. Nos. 4,710,713 and 4,717,876. NMR instruments known in the art are typically designed to make measurements corresponding to an amount of time for hydrogen nuclei present in the earth formation to realign their spin axes, and consequently their bulk magnetization, either with an externally applied magnetic field, or perpendicularly to the magnetic field, after momentary reorientation of the nuclear spin axes. The externally applied magnetic field is typically provided by a magnet disposed in the NMR instrument. The spin axes of the hydrogen nuclei in the earth formation are, in the aggregate, caused to be aligned with the magnetic field induced in the earth formation by the magnet. The NMR instrument includes an antenna positioned near the magnet and shaped so that a pulse of radio frequency (RF) power conducted through the antenna induces a magnetic field in the earth formation orthogonal to the field induced by the magnet. The RF pulse has a duration predetermined so that the spin axes of the hydrogen nuclei generally align themselves perpendicular both to the orthogonal magnetic field induced by the RF pulse and to the externally applied magnetic field. After the pulse ends, the nuclear magnetic moment of the hydrogen nuclei gradually "relax" or return to their alignment with the externally applied magnetic field. The amount of time taken for this relaxation is related to properties of interest of the earth formation.

After the RF pulse ends, the antenna is typically electrically connected to a receiver, which detects and measures voltages induced in the antenna by precessional rotation of the spin axes of the hydrogen nuclei. While the hydrogen nuclei gradually realign their spin axes with the magnet's field, they do so at different rates because of inhomogeneities in the magnet's field and because of differences in the chemical and magnetic environment within the earth formation. Different rates of realignment of the spin axes of the hydrogen nuclei results in a rapid decrease in the voltage induced in the antenna. The rapid decrease in the induced voltage is referred to as the free induction decay (FID).

After a predetermined time period following the FID, another, longer RF pulse is applied to the antenna. The longer RF pulse has a duration predetermined to realign the spin axes of the hydrogen nuclei in the earth formation by an axial rotation of 180 degrees from their immediately previous orientations. After the longer RF pulse (called a 180 degree pulse), hydrogen nuclear axes that were realigning with the externally applied field at a slower rate are then positioned so that they are "ahead" of the faster realigning spin axes. The 180 degree movement causes the faster realigning axes to be reoriented to be "behind" the slower realigning axes. The faster realigning axes eventually "catch up" to, and come into approximate alignment with, the slower aligning axes after the 180 degree reorientation. As a large number of the spin axes become aligned with each other, the hydrogen nuclei again are able to induce measurable voltages in the antenna. The voltage induced as a result of realignment of the hydrogen nuclear axes with each other after a 180 degree pulse is referred to as a "spin echo". The spin echo induced voltage is smaller than the original FID voltage generated after cessation of the first RF pulse, because the aggregate nuclear axial alignment, and consequently the bulk magnetization, of the hydrogen nuclei at the time of the spin echo is at least partially realigned with the magnet's field and away from the sensitive axis of the antenna. The spin echo voltage itself rapidly decays by FID as the faster aligning nuclear axes "dephase" from the slower aligning nuclear axes.

After another period of time equal to two of the predetermined time periods between the initial 90 degree RF pulse and the first 180 degree pulse, another RF pulse, of the same duration as the pulse causing the 180 degree shift in spin axis orientation, can be applied to the antenna. This next 180 degree pulse again causes the slower realigning spin axes to be positioned ahead of the faster realigning axes, and eventually another spin echo will induce voltages in the antenna. The induced voltages of this next spin echo will typically be smaller in amplitude than the previous spin echo.

Successive 180 degree RF pulses are applied to the antenna to generate successive spin echoes, each one typically having a smaller amplitude than the previous spin echo. The rate at which the peak amplitude of the spin echoes decays is related to properties of interest of the earth formation, such as the fractional volume of pore space or the fractional volume of mobile fluid filling the pore space. The number of spin echoes needed to determine the rate of spin echo amplitude decay is related to the properties of the earth formation; in some cases as many as 1,000 spin echoes may be needed to determine the amplitude decay corresponding to the properties of the earth formation which are of interest.

Methods of using spin echo measurements from NMR apparatus for determining the fractional volume of pore space and the fractional volume of mobile fluids are described, for example, in M. N. Miller et al, *Spin Echo Magnetic Resonance Logging: Porosity and Free Fluid Index Determination*, paper no. 20561, Society of Petroleum Engineers, Richardson, Tex., 1990.

Determining the pore size distribution from NMR spin echo measurements generally includes determining the relaxation (or $T_2$) "spectrum" of the spin echo signal. The sizes of a particular pore space in the earth formations affects the transverse relaxation time of the protons in any mobile fluid disposed in that particular pore space. The spin-echo signal received by the NMR apparatus will include the combined effect of the different relaxation times of the fluid protons disposed in various size pores in the earth formations. A typical spin echo signal can include the effects of an unknown number of exponential decay rates of various components of the overall signal.

A method of estimating the $T_2$ spectrum from NMR spin echo measurements is described in M. G. Prammer, *NMR*

*Pore Size Distributions and Permeability at the Well Site*, paper no. 28368, Society of Petroleum Engineers, Richardson, Tex., 1994. See also U.S. Pat. No. 5,517,115 issued to Prammer. The method described by Prammer includes generating an amplitude decay spectrum from a set of basis functions, each representing a different exponential rate of decay, and comparing the generated spectrum to the measured spin echo amplitude decay. Weighting factors for each individual basis function are determined by minimizing the difference between the measured decay amplitude and the generated amplitude decay spectrum.

A drawback to the method of estimating the $T_2$ spectrum described by Prammer is that the precise number of individual exponential decay rates present in the measured spin echo amplitude decay spectrum is not known, but must be estimated prior to generating the amplitude decay spectrum from the basis functions. The measured amplitude decay is likely to be fit to a generated spectrum which is either underdetermined or overdetermined, and may be less accurate than if the number of exponential decay rates were precisely known.

SUMMARY OF THE INVENTION

The invention is a method for determining the number of exponential decay modes in spin echo amplitude signals from a nuclear magnetic resonance well logging instrument. The method includes the step of dividing the time interval between initiation and termination of measurement of the spin echo amplitude signals into an odd number, $2r-1$, of equal length segments, where r is a positive integer. Integrals of the spin echo amplitude signals with respect to time are calculated in each of the segments. Best fit functions are calculated for the spin echo amplitude signals. The value of the best fit function at each corresponding time of measurement of a spin echo amplitude is calculated. These values are referred to as apparent amplitudes. Integrals with respect to time of the apparent amplitudes are calculated for each segment. The integrals of the spin echo amplitude signals, and the integrals of the apparent amplitudes from each segment are arranged into symmetric matrices each having dimensions r×r. If the norm of the determinant of the matrix is less than or equal to a selected confidence factor multiplied by the standard deviation of the determinant of the matrix, then the number of exponential decay modes in the spin echo amplitude is equal to $r-1$.

If the mean value of the norm of the determinant is not less than the standard deviation of the determinant of the matrix multiplied by the confidence factor, then r is increased by one and the entire process is repeated until the inequality is satisfied.

In a preferred embodiment of the invention, the relative amplitudes and decay times of each exponential decay mode can be determined by dividing the time interval into a first subinterval ending with the termination and beginning with a first selected time prior to the termination. The first subinterval is divided into three equal length subsegments. Integrals, with respect to time, of the spin echo amplitudes are calculated for each of the subsegments. Best fit functions of the amplitudes are calculated and apparent amplitudes of these best fit functions are calculated at each time corresponding to a time at which the spin echo amplitudes were measured. Integrals with respect to time are calculated for the apparent amplitudes in each of the subsegments. The integrals of the amplitudes and the integrals of said apparent amplitudes are each arranged into a 2×2 symmetric matrix. If the mean value of the norm of the determinant of the matrix is less than or equal to a selected confidence factor multiplied by the standard deviation of the determinant of the matrix, then the number of exponential decay modes in the subinterval is equal to one. The first selected time is then adjusted closer to the initiation and the previous steps are repeated until the mean value of the norm of the determinant is not less than the confidence factor multiplied by the standard deviation of the determinant of the matrix. The first selected time is incrementally adjusted closer to the termination, and a first optimal exponential function for the spin echo amplitudes within the first subinterval is then calculated. Values of the first optimal exponential function are subtracted from all of the spin echo amplitudes. The process is repeated for time interval from the adjusted selected time to a second selected time. When a second optimal exponential decay function is thus calculated, its values are subtracted from the spin echo amplitudes from which the values of the first optimal exponential decay function have already been subtracted. This entire process is repeated until optimal exponential decay functions have been determined for the entire number of decay modes in the spin echo amplitude measurements.

DESCRIPTION OF THE PREFERRED EMBODIMENT

An instrument suitable for making nuclear magnetic resonance (NMR) spin relaxation time (spin echo) measurements in earth formations penetrated by a wellbore is described, for example, in U.S. Pat. No. 4,717,877 issued to Taicher et al. The instrument described in the Taicher et al '877 patent includes a permanent magnet for imparting a static magnetic field within the earth formations adjacent to the wellbore, an antenna coil which can be wound around the magnet, circuitry for applying pulses of radio-frequency (RF) power to the antenna coil, and circuitry for detecting voltages induced in the antenna coil as a result of nuclear spin relaxation, particularly of hydrogen nuclei present in the earth formations.

The RF power pulses applied to the antenna coil of NMR apparatus such as the one in the Taicher et al '877 patent typically include an initial RF pulse having a duration timed to reorient the spin axes of hydrogen nuclei in the earth formations to be substantially perpendicular to the magnetization direction of the static magnetic field imparted by the magnet. The RF pulse induces an angular deflection of about 90 degrees in the spin axes of the hydrogen nuclei. Later in the measurement cycle, a sequence of additional RF pulses, called rephasing pulses, or "180 degree" pulses, each having a duration sufficient to reorient the extant nuclear spin axes by 180 degrees, is applied to the antenna coil. After each such 180 degree pulse the antenna coil is then connected to a receiver to detect voltages induced in the antenna coil as the nuclear spin axes "rephase", an event called the spin-echo. The amplitude of the induced voltages from spin rephasing (spin-echo voltages) decreases after each successive 180 degree pulse applied to the antenna coil. The rate at which the amplitude of the successive spin-echo voltages decays is related to properties of the earth formations such as fractional volume of pore space, the bulk volume of mobile fluids filling the pore space, and the size distribution of the pore spaces.

Generally speaking, the amplitude of the spin-echo voltage decays exponentially. The rate of decay is affected by the previously recited properties of the earth formation. As is known in the art, the decay rate of the spin-echo voltage can be characterized as a combination of different components each having its own individual exponential rate of decay. Each different exponential rate, referred to as a "mode", contributes a fractional amount to the overall spin echo amplitude decay rate. For a hypothetical "pure" spin echo signal measurement, in which the measured voltage is exactly equal to the "true" magnitude of the spin echo generated by the precessing nuclei, the relationship of the spin-echo measurement amplitude with respect to time can be expressed as:

$$A(t) = \sum_{i=1}^{M} A_i \exp[-t/T_i] \quad (1)$$

where $A(t)$ represents the signal amplitude with respect to a time $t$ elapsed from the initiation of a measurement sequence. $T_i$ represents the intrinsic relaxation time of the i-th component, or "mode", present in the spin-echo decay signal. $A_i$ represents the fractional contribution to the overall decay of the i-th decay mode, and M represents the total number of such exponential decay modes present in the overall spin-echo decay signal. The total number of exponential decay modes, and the fractional contribution of each mode to the overall decay rate can be related to properties of the earth formations such as the size distribution of pore space in the earth formation. See for example M. G. Prammer, *NMR Pore Size Distributions and Permeability at the Well Site*, paper no. 28368, Society of Petroleum Engineers, Richardson, Tex., 1994. As is well known in the art, the spin echo amplitude actually measured by an NMR well logging instrument will be affected by noise and the statistical precision of the instrument itself. Therefore the measured spin echo amplitudes cannot precisely represent the actual magnitude of the spin echoes. The importance of this fact as it relates to the invention will be further explained.

Once again referring to the hypothetical case of "pure" spin echo amplitude measurements, the time span between successive initiations of a spin-echo measurement sequence (generally referred to as TE) can be divided into a quantity, $(2r-1)$, of equal length, contiguous time segments (which would have "nodes", or dividing points, at equally spaced apart times). An integral, $a_j^{(r)}$, of the "true" or "pure" (as contrasted with the ones measured by the NMR well logging instrument) spin-echo amplitudes occurring during each segment can be calculated for each of these equal length time segments by the expression:

$$a_j^{(r)} = \int_{t_j-1}^{t_j} A(t)dt, \quad (2)$$

$$j = 1, 2, \ldots, (2r-1)$$

The integrals calculated for the "true" spin echo amplitudes in each segment can be arranged in the form of a symmetrical matrix, I, having dimension $r \times r$ (where $2r-1$ represents, as previously stated, the number of segments) according to the following expression:

$$I = I(a_j^{(r)}, \ldots, a_{2r-1}) = \begin{vmatrix} a_1^{(r)} & \ldots & a_r^{(r)} \\ \vdots & & \vdots \\ a_r^{(r)} & \ldots & a_{2r-1}^{(r)} \end{vmatrix} \quad (3)$$

It has been determined that the matrix I satisfies the condition that its determinant is non-zero if and only if its dimension, r, does not exceed the total number of exponential decay modes, M, present in the "true" spin-echo decay signal. For example, if r=2, the number of segments would be equal to 3 (2×2−1), and a 2×2 symmetric matrix including the integrals of the amplitudes for each of the three segments would be non-zero if the number of exponential decay modes is greater than or equal to two. A proof of this theorem is provided in the appendix.

To illustrate the use of this property of the matrix I in the invention, initially the spin echo decay amplitudes can be integrated over the entire time interval from the initiation of spin echo amplitude measurement at time $t=t_0$ out to the time at which the spin echo measurements terminate, this time referred to by $t=t_x$. The termination time, $t_x$, can be just before the start of a subsequent spin-echo measurement sequence. Integrating the spin echo amplitudes over the entire time span is equivalent to setting r=1. If the value of the integral is non-zero for a particular preselected "confidence level", which will be further explained, then the number of modes M must be greater than or equal to one. If the number of modes is greater than or equal one, it is the case that a spin echo signal having exponentially decaying amplitude was probably detected. The confidence level represents the probability that the value of the integral actually includes the value selected.

Next, the time interval from $t_0$ to $t_x$ can be subdivided into three equal length, contiguous segments. In this case r=2. Integrals of the "true" spin-echo signal $a_1^{(2)}, a_2^{(2)}, a_3^{(2)}$ within each of the three segments can be calculated, and these integrals can be arranged into a matrix I as previously described having dimension 2×2. If the determinant of the matrix I in this case is equal to zero, then the number of modes M is equal to one. If the determinant of I is non-zero, then the number of modes is greater than or equal to two.

If the determinant of matrix I, when r=2, is non-zero, indicating that there are two or more exponential decay modes in the "true" decay signal, then the time interval from $t_0$ to $t=t_x$ can be subdivided into five equal-length, contiguous segments. In this case r=3. The process of calculating integrals of the spin-echo signal over each of the five time segments, arranging the integrals in the matrix I (this time having dimension 3×3), and calculating the determinant of I can be repeated. If the determinant is zero, then the number of modes would be equal to two. If the determinant is non-zero then the number of exponential decay modes is greater than or equal to three.

If the determinant of I in the previous step is non-zero, indicating that the number of modes is three or more, then the process can be repeated by dividing the time interval from $t_0$ to $t=t_x$ into seven equal-length, contiguous segments (in this case r=4), and repeating the process of integrating measurements in each segment, arranging the integrals in matrix I, and calculating the determinant.

This entire process can be repeated until the determinant of I is equal to zero, in which case the number of modes, M, in the signal is equal to r−1.

As previously explained, the NMR well logging instrument will generate measurements of spin echo amplitude which do not exactly match the "true" or "pure" spin echo amplitudes. Therefore direct evaluation of the determinant of matrix I, using only unprocessed spin echo amplitude measurements from the NMR well logging instrument, would be subject to error as a result of the noise and statistical uncertainty of the measurements themselves. The method of the invention is directed to evaluating the determinant of matrix I in the presence of noise and statistical error of measurement of the spin echo amplitude.

Figure 1:
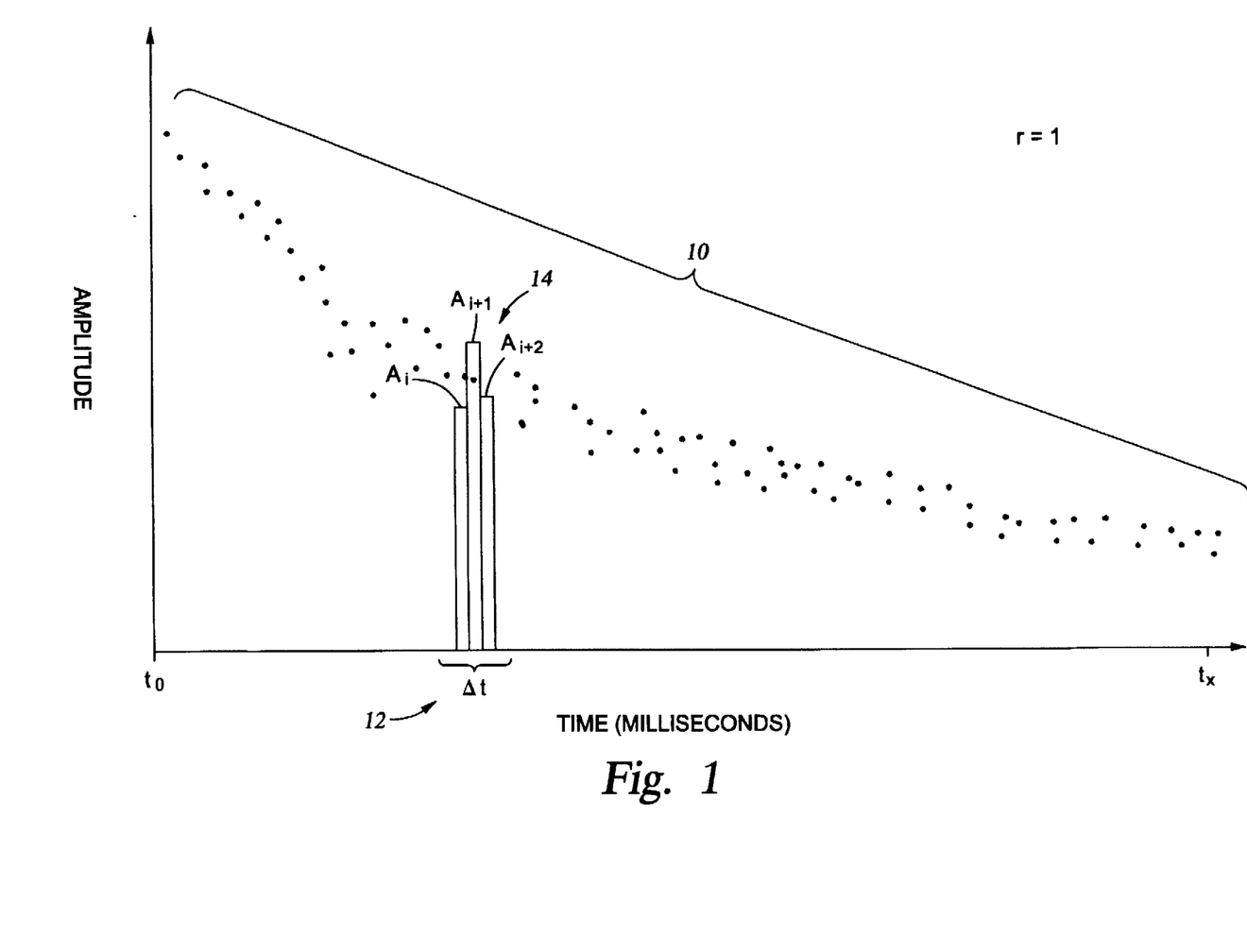
FIG. 1 shows a graph of typical NMR spin echo amplitudes.

A typical set of measured NMR spin echo amplitudes is shown in the graph of FIG. 1. The measured spin echo amplitudes are represented by individual points, shown generally at 10, having coordinates corresponding to peak amplitude and time of measurement. The integral of the measured spin echo amplitudes (as contrasted with the "true" spin echo amplitudes previously described herein) will hereinafter referred to by $a'_j{}^{(r)}$. The value of this integral can be calculated using a rectangular approximation formula, such as:

$$a'^{(r)} = \int_{t_0}^{t_x} A(t)dt \approx \sum_{i=1}^{N} A(t_i)\Delta t \qquad (4)$$

where $\Delta t$, shown at 12 in FIG. 1, represents the time increment between successive spin echo amplitude measurement values, and $A_i$, shown at 14, represents the amplitude of the spin echo measured at time i. If the integral of the entire span from $t_0$ to $t_x$ is less than the value of a "norm", which will be further explained in equation (9), infra, then at least one exponential decay mode exists in the spectrum represented by the measured amplitude points 10.

Figure 2:
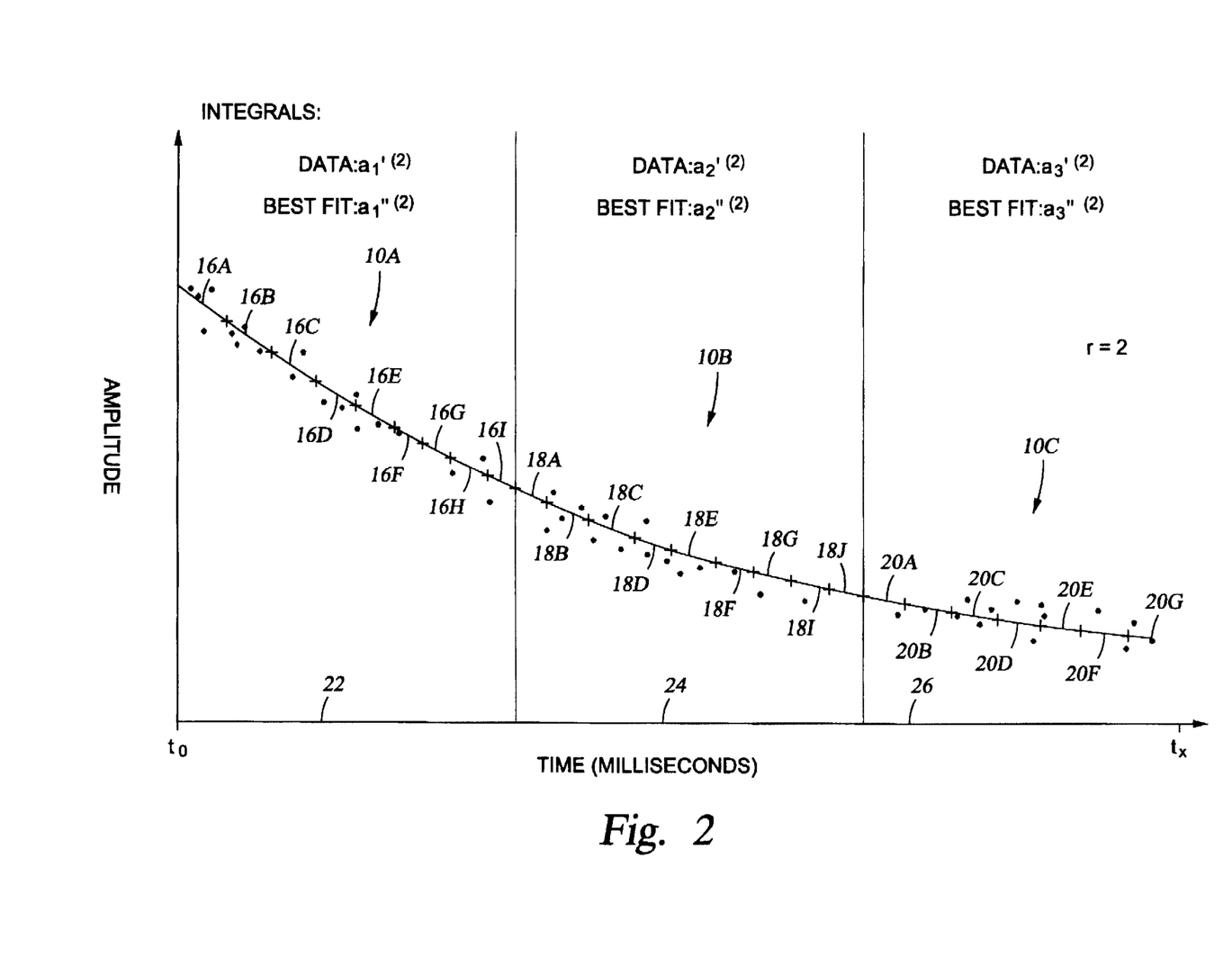
FIG. 2 shows the graph of spin echo amplitudes in FIG. 1 divided into three equal-time segments.

The time span from $t_0$ to $t_x$ can then be divided into three segments. In this case r=2. These are shown in the graph of FIG. 2 at 22, 24 and 26. Measured spin echo amplitudes in each segment are shown at 10A, 10B and 10C, respectively. Measured spin echo amplitude integrals, $a'_j{}^{(r)}$, for each segment 22, 24, 26 are typically calculated, using a formula as in equation (4), from the beginning time to the ending time of each segment. These integrals are shown, respectively, as $a'_1{}^{(2)}$, $a'_2{}^{(2)}$ and $a'_3{}^{(2)}$. Concurrently with evaluating the integrals of the measured spin echo amplitudes over each segment, the measured spin echo amplitude values in each segment can be used to calculate "best-fit" functions of the measured spin echo amplitude values. The best fit functions can be calculated using linear regression, or similar technique. Preferably, each segment is further subdivided so that a number of contiguous best fit functions can be calculated for portions of the spin echo measurements within each segment. In this example the total time interval from $t_0$ to $t=t_x$ has been subdivided into three segments. The total number of spin echo amplitude measurements in the time interval from $t_0$ to $t=t_x$ can be 900 (a typical number of measurements for NMR well logging instruments). Each segment would include 300 spin echo amplitude measurements. Each segment can include about 9 contiguous best fit functions each calculated from about 33 spin echo amplitude measurements. For example, the first segment 22 includes best fit functions shown at 16A through 16J. The second segment 24 shows best fit functions 18A through 18J, and third segment 26 shows best fit functions 20A through 20J. The number of best fit functions is not to be construed as a limitation on the invention, nor is the manner of calculating the best fit functions meant to limit the invention. For example, the best fit function could also be calculated as a third or a fourth order polynomial, rather than a linear function. The number of spin echo amplitude measurements used to calculate each best fit function only needs to be statistically significant. As is understood by those skilled in the art, the actual number of spin echo measurements needed to be statistically significant will depend on the signal to noise ratio of the spin echo amplitude measurements themselves. However, ten measurements will be sufficient in the majority of cases for the typical time spacing between spin echo measurements when spin echo measurements are made in earth formations. Integrals for these best fit functions, referred to as $a''_j{}^{(r)}$ are preferably calculated using the same rectangular approximation formula as described in equation (4). These integrals are shown in FIG. 2 as $a''_1{}^{(2)}$, $a''_2{}^{(2)}$ and $a''_3{}^{(2)}$. Alternatively, the integrals can be explicitly determined for each best fit function, and these integrals can be evaluated over the time span including the times of measurement for each spin echo measurement included in each integral.

The magnitude of each best fit function can also be evaluated at the time of measurement of each spin echo amplitude to generate an "apparent" spin echo amplitude value for each measurement time. The "apparent" amplitude values calculated from the best fit functions can be used to calculate statistical information about the "measured" spin echo amplitude values (the "measured" values, again, being the amplitude measurements actually made by the NMR instrument). The statistical information is used in evaluating the determinant of matrix I, as will be further explained. The standard deviation, $\sigma$, of the measured amplitudes with respect to the apparent amplitudes can be evaluated according to the expression:

$$\sigma = \sqrt{\frac{1}{(N-1)} \sum_{i=1}^{N} (A'_i - A''_i)^2} \qquad (5)$$

where N represents the number of spin echo measurements used in calculating the statistical information (usually equal to the number of measurements in each segment for which an integral is to be calculated), $A''_i$ represents the apparent amplitude (the value of the best fit function) at measurement time i, and $A'_i$ represents the measured spin echo amplitude at time i. A standard deviation can be calculated for each integral simply by multiplying the standard deviation of the measurements ($A'_i$) themselves by the square root of the number of measurements used to calculate the standard deviation. This can be expressed by the formula:

$$\sigma(a'_i{}^{(r)}) = \sigma(A'_i)\sqrt{N} \qquad (6)$$

After the standard deviation of each integral of the measured amplitudes is calculated, two statistical measures can be calculated: the first of which, $\delta_r$, corresponds to the difference between the mean of the determinant of a matrix consisting of the integrals of the measured spin echo amplitudes, and the determinant of a matrix consisting of the integrals of the apparent values of the spin echo amplitudes (which are evaluations for the true spin echo amplitude values). The difference between this value, $\delta_r$, and the value of the determinant of the matrix of the integrals of the spin echo amplitudes will be referred to for the sake of convenience as the "norm" of the determinant of the matrix of the spin echo amplitudes. The mean value of the norm appears in equation (9), infra. The second statistical measure, $\sigma^2_{det\,I}$, represents the variance of the value of the determinant of the matrix consisting of the values of the integrals of the measured amplitude values. These two statistical measures can be expressed by the formulas:

$$\delta_r = \overline{\det\,I}(a'_1{}^{(r)}, \ldots, a'_{2r-1}{}^{(r)}) - \det\,I(a''_1{}^{(r)}, \ldots, a''_{2r-1}{}^{(r)}) \qquad (7)$$

and:

$$\sigma^2_{det\ I(a'_1{}^{(r)},\ \ldots,\ a'_{2r-1}{}^{(r)})} = \overline{det\ I(a'_1{}^{(r)},\ \ldots,\ a'_{2r-1}{}^{(r)})^2} - [\overline{det\ I(a'_1{}^{(r)},\ \ldots,\ a'_{2r-1}{}^{(r)})}]^2 \quad (8)$$

Formulas to calculate the norm and the standard deviation of the determinant directly on the cases where r=1, 2 or 3 are shown in the appendix. If r is more than three, the values of the norm and standard deviation can also be calculated because all the moments of a normal distribution can be expressed in terms of the first and second moments of a normal distribution. It is assumed for the purpose of calculating the norm and standard deviation that the measured spin echo amplitudes are normally distributed with respect to the "true" amplitude values.

When the inequality is satisfied, between the mean value of the norm, and the standard deviation of the value of the determinant of the matrix of the measured spin echo amplitudes multiplied by a selected confidence factor, g, as shown below:

$$|det\ I(a'_1{}^{(r)},\ \ldots,\ a'_{2r-1}{}^{(r)}) - \delta_r| \leq g\sigma_{det\ I\ (a'_1{}^{(r)},\ \ldots,\ a'_{2r-1}{}^{(r)})} \quad (9)$$

then the condition is satisfied that there is one less exponential decay mode M than the dimension r of the matrix. g can be selected by the system operator. The value of g which produces good results typically falls in the range of 2.0 to 2.5.

Figure 3:
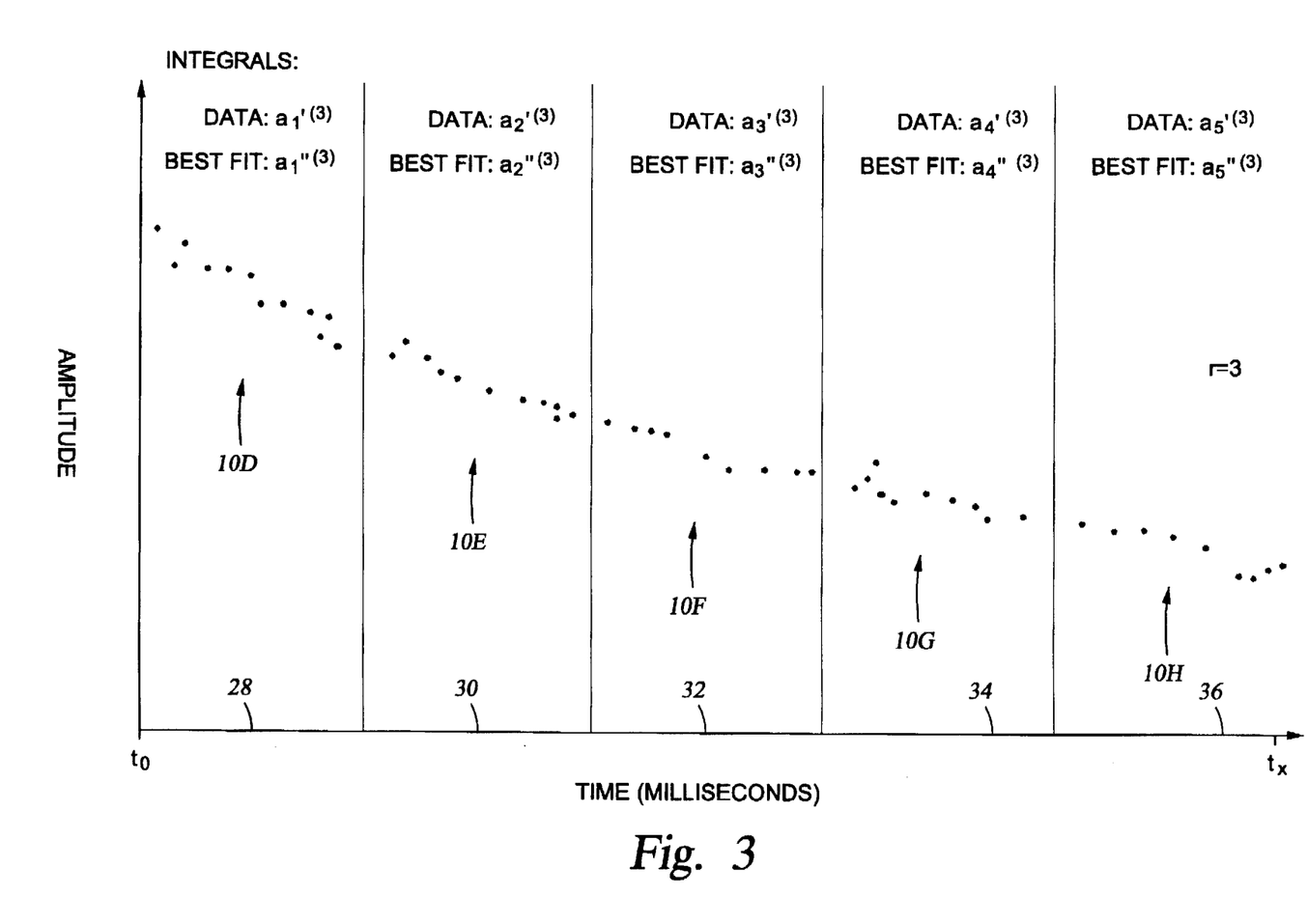
FIG. 3 shows the graph of the spin echo amplitudes in FIG. 1 divided into five equal-time segments.

Should the determinant thus calculated be determined to be non-zero at the selected confidence level, then the process of subdividing the time span from $t_0$ to $t_x$ can be repeated using five equal-length segments. In this case r=3. This is shown in the graph in FIG. 3. Segments are shown at 28, 30, 32, 34 and 36. The points are shown grouped in their respective segments at 10D, 10E, 10F, 10G and 10H. The process of calculating the determinant of the 3×3 (r×r) matrix formed using the values of the integrals of the measured amplitude values can be evaluated to determine whether the number of exponential decay modes is two (when the inequality of equation (9) is satisfied), or whether the number of modes is three or more (meaning that the inequality of equation (9) is not satisfied).

The process of subdividing the time span, calculating best fit functions, and integrals for the measured amplitudes and the best fit functions can be repeated until the inequality of equation (9) is satisfied. When the inequality of equation (9) is satisfied, the number of modes M is equal to r−1.

Having determined the number of exponential decay modes, M, in the spin echo amplitude decay curve, the individual exponential decay times, $T_i$, and relative amplitudes, $A_i$, as defined in equation (1) can be determined using curve fitting techniques known in the art. For example, the Levenberg-Marquardt algorithm can be used to minimize the difference between the actual spin echo amplitude decay curve and a "modelled" curve using a number of individual exponential decay times and relative amplitudes which equals the number of modes determined as previously described.

DESCRIPTION OF A SPECIFIC EMBODIMENT

Although the number of modes, M, determined as previously described herein can be used to calculate individual exponential decay times and relative amplitudes using curve fitting techniques known in the art, the process of calculating the individual exponential decay times and relative amplitudes can be substantially improved by extending the method of the invention to include a new method of calculating the individual exponential decay times and relative amplitudes.

Exponential decay functions (with respect to time) have the property that a first such function which decreases at a faster rate than does a second such function will have a much smaller value at times after the time origin than will the second such function. The faster rate of the first function is equivalent to a shorter intrinsic relaxation time $T_2$ as related to NMR spin echo amplitude measurement. In the spin echo amplitude decay curve defined by the points 10 on the graph in FIG. 1, the overall decay rate of the NMR spin echo amplitudes is generally the result of superposition of each of the individual exponential spin echo amplitude decay functions. This property of exponential decay functions, as applied to the overall spin echo amplitude decay rate, generally results in only one exponential decay rate being represented in the points which occur near the end of the spin echo amplitude measurement sequence (near time $t_x$). This is because the amplitudes of the other exponentially decaying signal components have insignificant amplitudes at these later times. This property can be used to extract the individual amplitude decay components as will be explained.

Analysis of the spin echo amplitudes to determine the individual relaxation times and the relative amplitudes can begin by selecting an arbitrary time position, $t_y$, close in time to $t_x$. Preferably $t_y$ is not earlier than the initial time of the last time segment from the previously described process of determining the number of exponential decay modes (described in the first embodiment of the invention). The time span from $t_y$ to $t_x$ can then be divided into three equal length subsegments. In each subsegment the integrals of the measured spin echo amplitudes can be determined as described previously. Best fit functions, and their respective integrals, for each subsegment can be calculated as previously described. Then the determinant of 2×2 matrices, formed from these integrals as previously described herein in the first embodiment of the invention (for the case of r=2) can be evaluated according to the expression in equation (9). If the value of $t_y$ is such that only one exponential decay mode is present in the spin echo amplitudes between $t_y$ and $t_x$, then the inequality of equation (9) will be satisfied.

If the inequality of equation (9) is satisfied, $t_y$ can be adjusted by a small amount towards $t_0$. The adjustment time can be approximately 1/10 the time span of one of the segments as generated in the first embodiment of the invention, but this amount should not be construed as a limitation on the invention. Other values of incremental time adjustment will also perform correctly. The time span between the adjusted $t_y$ and $t_x$ can be redivided into three equal length subsegments, and the process of calculating best fit functions and integrals, and evaluating the determinant as in equation (9) can be repeated.

This entire process of adjusting the time position of $t_y$, redividing the adjusted time span between $t_y$ and $t_x$ into three equal length subsegments, and calculating best fit functions, integrals of the measured amplitudes and the best fit values, and evaluating the determinant can be repeated until the inequality of equation (9) is not satisfied. At this point, the spin echo amplitudes in the time span from $t_y$, as most recently adjusted, and $t_x$, will include two exponential decay modes. A new time can be defined, $t_z$, located just a sufficient number of spin echo amplitude measurement samples towards $t_x$ from the final adjusted value of $t_y$ to include only one exponential decay mode (generally one or two spin echo amplitude sample time increments). The time span from $t_z$ to $t_x$ will then define a portion of the spin echo amplitude decay curve having only the longest intrinsic relaxation time as its single exponential decay mode.

The spin echo amplitude measurements between $t_z$ and $t_x$ can then be used to determine the intrinsic relaxation time and the relative amplitude of this "slowest" decaying mode. This determination can be performed using curve fitting methods well known in the art. Having determined the intrinsic relaxation time and relative amplitude of the slowest decaying mode, an apparent amplitude at every time from $t_0$ to $t_z$, can be calculated according to the relationship as defined by the intrinsic relaxation time and relative amplitude just calculated. These apparent amplitude can then be individually subtracted from the spin echo amplitude decay measurements made at the corresponding times between $t_0$ and $t_z$. The resulting amplitudes will only include the effects of the as yet undetermined decay modes, since the contribution of the longest decay mode has been removed by the step of subtraction. A new time span, ending at $t_z$ and starting at another selected time $t_a$, can be then be defined just as was done in previously defining the time span from $t_x$ to $t_y$. The time span between $t_z$ and $t_a$ can then itself be divided into three equal length subsegments. The process of calculating integrals and evaluating the matrix determinant as described for extracting the first (longest) exponential decay mode is repeated. If the value of the determinant satisfies the inequality of equation (9), then only one exponential decay mode exists in the time span starting at $t_z$ and ending at $t_a$. The time position of $t_a$ can then be adjusted towards $t_0$ and the process of calculating integrals and evaluating the determinant can be repeated until the inequality of equation (9) is not satisfied. At this point, the time span starting at $t_z$ and ending at $t_a$ will have two exponential decay modes. $t_a$ can then be adjusted as previously described for $t_y$ so that spin echo amplitude measurements made within the time span starting at $t_z$ and ending at $t_a$ will include the effects of only the second exponential decay mode. Amplitude measurements made within the time span starting at $t_z$ and ending at $t_a$ can then be used to calculate the intrinsic relaxation time and relative amplitude of the second exponential decay mode using curve fitting techniques well known in the art, just as for determining the relaxation time and relative amplitude for the first mode. A relationship defined by the intrinsic relaxation time and relative amplitude of the second exponential decay mode as just determined can be used to calculate apparent amplitudes for every spin echo measurement time within the time span from $t_0$ to $t_z$. The apparent amplitudes can be individually subtracted from the spin echo amplitude measurements made at each corresponding time within the time span from $t_0$ to $t_z$. The resulting amplitude measurements will include only the effects of the as yet undetermined exponential decay mode components. The effects of the first and the second exponential decay modes have been removed by the two steps of subtraction. This entire process can be repeated until the remaining time span from $t_0$ to the most recently calculated end point (similar to $t_y$, $t_z$, and $t_a$) is used to determine the last undetermined exponential decay mode.

After all the intrinsic relaxation times and relative amplitudes have thus been determined, the values of intrinsic relaxation times and relative amplitudes can be used as an initial estimate of the amplitude decay spectrum as described by the spin echo amplitude measurements (as represented by points 10 in FIG. 1). The values of intrinsic relaxation times and relative amplitudes can be optimized by comparison with the spin echo amplitude measurements made by the NMR logging instrument. The values can then be optimized with respect to the measured amplitudes by any well known optimization routine such as the Levenberg-Marquardt algorithm. See for example, W. H. Press et al, *Numerical Recipes in Fortran*, Cambridge University Press (1986).

Figure 4:
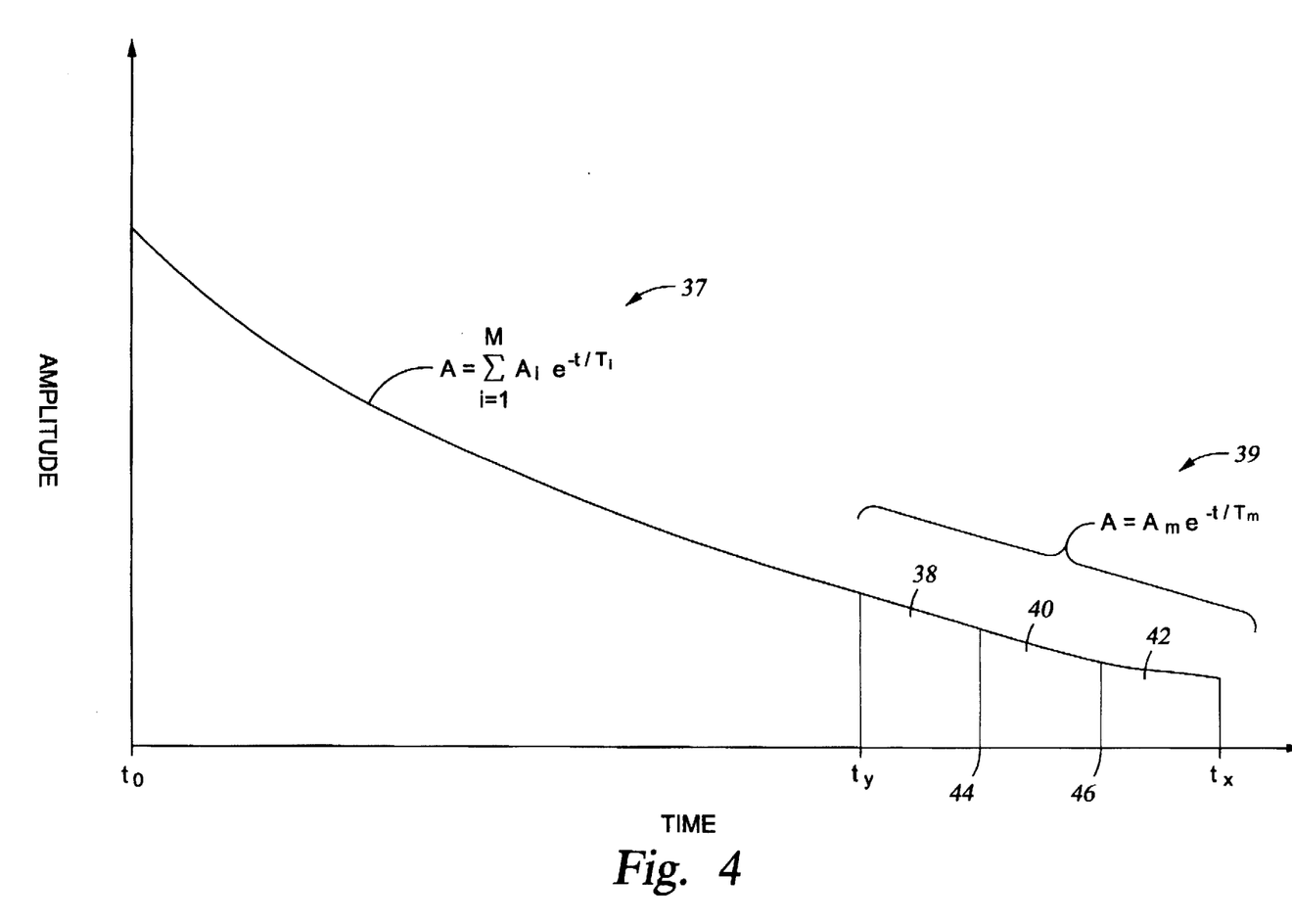
FIG. 4 shows a graph of the spin echo amplitude divided into subsegments in order to determine the slowest exponential decay mode.
Figure 5:
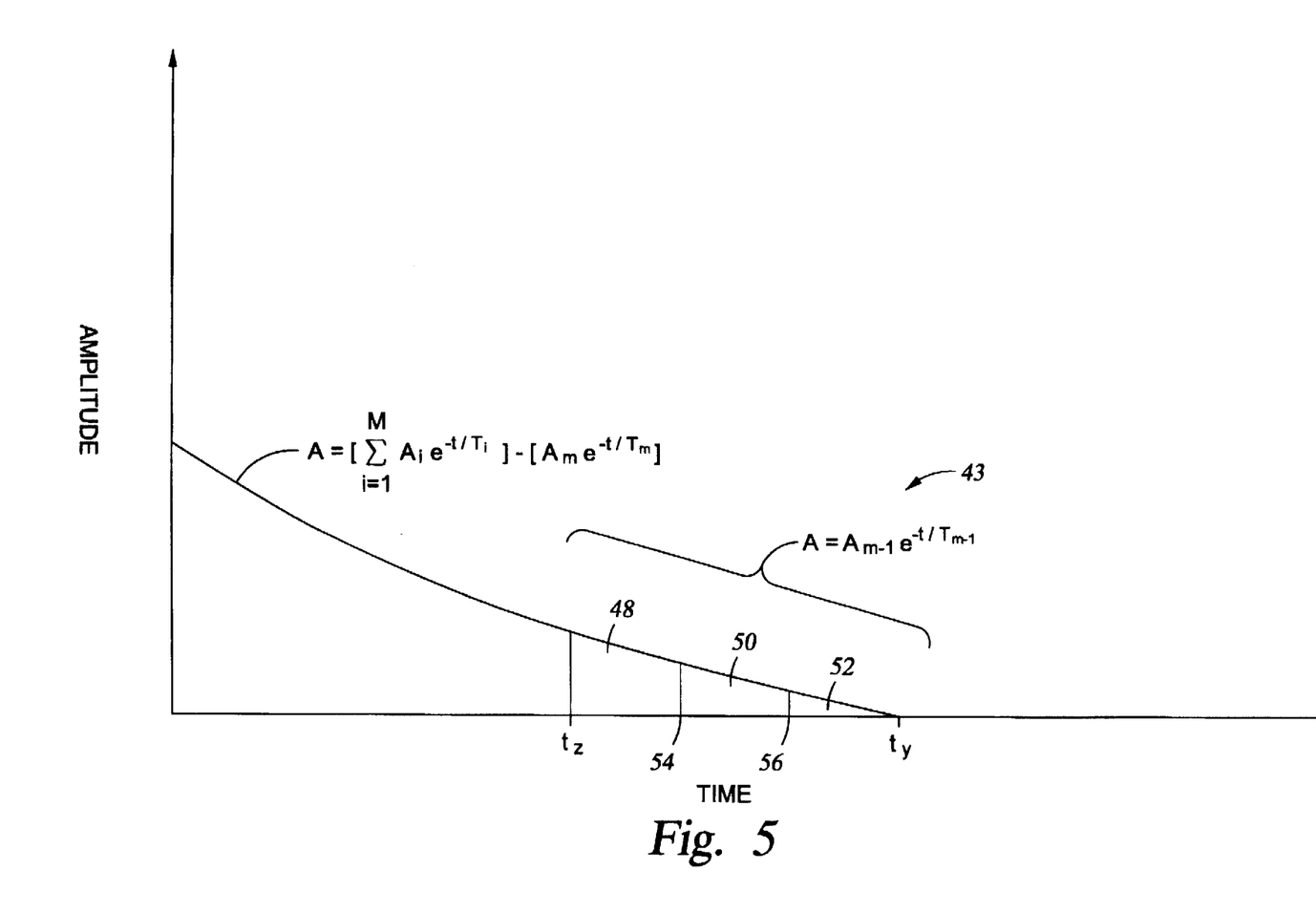
FIG. 5 shows a graph of the spin echo amplitude divided into subsegments after subtraction of the slowest mode identified in the step shown in FIG. 4.

The foregoing process is illustrated in FIGS. 4 and 5. FIG. 4 shows a graph including the curve 37 of the best fit function for the spin echo amplitude measurements. The curve 37 is shown as being composed of the sum of the M exponential decay modes, each having its own intrinsic decay time and relative amplitude. The time of termination of the spin echo amplitude measurements is shown at $t_x$, and the arbitrary time position is shown at $t_y$. The time span between $t_x$ and $t_y$ is divided into three equal length subsegments, shown at 38, 40 and 42. Nodes 44 and 46 dividing the subsegments 38, 40, 42 will be positioned at times equal to $[\frac{1}{3}(t_x-t_y)+t_y]$ and $[\frac{2}{3}(t_x-t_y)+t_y]$, respectively. The position of $t_y$ is adjusted towards $t_0$, the positions of the nodes 44, 46 set, and the values of integrals in each of the segments 38, 40, 42 calculated just until the time that the determinant of the matrix, calculated as previously described, is not zero at the selected confidence level. After final adjustment of the position of $t_y$ as described herein, the segment of the amplitude curve shown at 39 will include substantially only the contribution of the slowest (longest) decaying mode, having relative amplitude $A_M$ and intrinsic decay time $T_M$. As previously explained, the relative amplitude $A_M$ and the intrinsic decay time $T_M$ can readily be determined by curve fitting techniques known in the art.

In FIG. 5, the resulting amplitude curve, shown at 41, has had calculated values of the M-th exponential decay mode subtracted from every value of spin echo amplitude. Since the more slowly decaying components of the M-th decay mode have been subtracted from the amplitude decay curve 41, the amplitude decay curve 41 asymptotically approaches zero at time $t_y$. The decay curve 41 is then bounded by the second arbitrary time $t_z$, and the time span between $t_y$ and $t_z$ is subdivided into three equal length subsegments, shown at 48, 50 and 52. Nodes 54 and 56 dividing the subsegments can be positioned by a formula similar to the one describing the positioning of nodes 44 and 46 in FIG. 4. The integrals of the amplitudes in the subsegments 48, 50, 52 are calculated as previously described herein, and the determinant of the matrix is calculated. This process is repeated after adjustment of the time position of $t_z$ until the determinant is not zero at the selected confidence level, and the final position of $t_z$ is then adjusted as previously described. The segment of the decay curve thus defined between $t_y$ and $t_z$, shown at 43 in FIG. 5, will then include substantially only the contribution of the (M−1)-th exponential decay mode. The values of the (M−1)-th decay mode can then be subtracted from the exponential decay curve 41 (from which the M-th mode has already been subtracted) and the process repeated until all M exponential decay modes have been defined.

It will be readily appreciated by those skilled in the art that the process of determining the intrinsic relaxation times and relative amplitudes as described in this particular embodiment of the invention could also be used alone, without a priori determining the number of exponential decay modes as described in the first embodiment of the invention.

APPENDIX

1. Proof of the Theorem Concerning the Number of Modes in an Exponential Decay Function Consider a finite sequence of complex numbers, $\lambda$, having an odd number, $(2r−1)$, of elements:

$$\lambda = (\lambda_1, \lambda_2, \ldots, \lambda_{2r-1}) \tag{A1}$$

A symmetrical matrix having dimension r×r can be generated using the elements of $\lambda$. The determinant of this matrix, $\Delta$, can be expressed as:

$$\Delta_r(\lambda) = det \begin{vmatrix} \lambda_1 & \ldots & \lambda_r \\ \cdot & & \cdot \\ \cdot & & \cdot \\ \cdot & & \cdot \\ \lambda_r & \ldots & \lambda_{2r-1} \end{vmatrix} \quad (A2)$$

The theorem to be proven is that when the sequence $\lambda$ in equation (A1) consists values of a sum of a geometric progressions such as:

$$\lambda_s = \sum_{i=1}^{M} s_i d_i^{s-1}, \quad (A3)$$

$$s = 1, 2, \ldots, 2r-1$$

then the determinant of a symmetric matrix consisting of the elements of the sequence $\lambda$ is equal to:

$$\Delta_r(\lambda) = \begin{cases} 0, \text{ if } M < r \\ \\ \sum_{1 \leq k_1 < \ldots < k_r \leq M} \left( \prod_{p=1}^{r} c_{k_p} \right) \prod_{1 \leq p < q \leq r} (d_{k_q} - d_{k_p})^2 \end{cases}, \text{ if } M \geq r \quad (A4)$$

where the sum is taken over all subsets having r-elements of $(1, 2, \ldots, M)$. In particular, all the progressions are assumed to be non-zero and are assumed to have different denominators: $c_i$, $d_i$ are both always non-zero, all $c_i$ have the same sign, and $d_i$ is not equal to $d_j$ when i is not equal to j. Given these assumptions, the value of the determinant of the matrix is non-zero if the number of modes, M, is greater than or equal to the quantity r.

The formula in equation (A4) is proved as follows. Direct computation of the expression in (A2) for $\lambda_z$ in equation (A3) yields the following:

$$\Delta_r = \quad (A5)$$

$$\sum_{1 \leq k_1 < \ldots < k_r \leq M} \left( \prod_{p=1}^{r} c_{k_p} \right) \sum_{\pi} V_r(d_{k_{\pi(1)}}, \ldots, d_{k_{\pi(r)}}) \prod_{p=1}^{r} d_{k_{\pi(p)}}^{s-1}$$

where the internal sum is taken over the entire number of permutations, $\pi$, of a set having a quantity r of elements and $V_r$ represents the Vandermonde determinant:

$$V_r(d_1, d_2, \ldots, d_r) = det \begin{vmatrix} 1 & \ldots & 1 \\ d_1 & \ldots & d_r \\ \cdot & & \cdot \\ \cdot & & \cdot \\ \cdot & & \cdot \\ d_1^{r-1} & \ldots & d_r^{r-1} \end{vmatrix} \quad (A6)$$

The determination of this matrix is skrew-symmetric with respect to the columns in the matrix. It is possible to derive from equation (A3) that $\Delta_r = 0$ when r is greater than M. In the case when r is less than or equal to M, equation (A4) follows from both equation (A5) and from the following identity:

$$\sum_{\pi} V_r(d_{\pi(1)}, \ldots, d_{\pi(r)}) \prod_{p=1}^{r} d_{\pi(p)}^{s-1} = \prod_{1 \leq p < q \leq r} (d_q - d_p)^2 \quad (A7)$$

The above identity may be proved as follows. It can be assumed that elements $d_1, \ldots, d_r$ are algebraically independent with respect to the ring of integers, $\mathfrak{E}$, which permits the inference that $d_1, \ldots, d_r$ are independent variables. The left hand side of equation (A7) is a homogeneous polynomial with respect to $d_1, \ldots, d_r$ of the degree $r(r-1)$. This homogeneous polynomial has a value of zero if $d_p = d_q$ when $p \neq q$. Since $(d_p - d_q)$ are prime elements in the ring of polynomials $\mathfrak{E}[d_1, \ldots, d_r]$ and since this ring has the so-called univalent factorization property (a so-called "factorial ring"), then the left hand side of equation (A7) is divided by:

$$\prod_{1 \leq p < q \leq r} (d_q - d_p) \quad (A8)$$

in the ring $\mathfrak{E}[d_1, \ldots, d_r]$ of polynomials over the field of rationals $\mathfrak{R}$, and therefore it is also divided in $\mathfrak{E}[d_1, \ldots, d_r]$ since the contents of the polynomial:

$$\Pi(d_q - d_p) \quad (A9)$$

are equal to 1. On the other hand, the left hand side of equation (A7) is symmetric with respect to $d_1, \ldots, d_r$ (in other words, it is an even function of the variables $x_{pq} = d_q - d_p$), and therefore it must be divided by:

$$(\Pi(d_q - d_p))^2 \quad (A10)$$

Thus, it has been proven that the left hand side of equation (A7) is divided by the right hand side in the ring $\mathfrak{E}[d_1, \ldots, d_r]$. Since the degrees are equal, the quotient actually belongs to $\mathfrak{E}$. This quotient can be computed by comparing coefficients of the corresponding term:

$$\prod_{p=1}^{r} d_p^{2(p-1)} \quad (A11)$$

In both parts of equation (A17), the coefficients are equal to 1. The proof of (A4) for $\lambda_s$ in equation (A3) is therefore complete. This formula is applicable to the sequence of integrals of the function in equation (2) over successive equal intervals of time, since such a sequence of integrals is merely a sum of geometric progressions of elements each having the same sign. The integrals of exponential decay modes which form such geometric progressions are:

$$\int_{t_{j-1}}^{t_j} Ae^{-t/T} dt = -AT[e^{-(t_0+jh)/T} - e^{-(t_0+(j-1)h)/T}] = cd^{j-1} \quad (A12)$$

where:

$$c = (1 - e^{-h/T})ATe^{(-t_0/T)}, \quad d = e^{-h/T} \quad (A13)$$

and where $h = t_1 - t_0 = \ldots = t_j - t_{j-1} = \ldots$. In the case where $1/T = 0$, it is also the case that $c = Ah$, $d = 1$. Since sign $c = $ sign (Ah), then the theorem for the integrals of a linear combination of exponential modes is implied because this combination is assumed to be positive.

It should be emphasized that the theorem is valid regardless of the signs of the individual exponential decay rates $1/T_i$. The only requirement for the theorem to be valid is that the exponential decay rates be real numbers. Coefficients $A_i$ must all have the same sign (i.e., they must all be either positive or negative).

2. Calculations for the values of $\delta_r$ and $\sigma_{det\ I}$

As examples, let r=1, 2, 3. In the following description, a with an overbar will designate the mean value of a particular integral of measured spin echo amplitudes, designated as a'. In fact one does not know the mean value of the integral a' and should instead use evaluations of the mean value of the integral of the best fit functions a". For r=1, $\delta_1$, is equal to:

$$\delta_1 = \overline{a_1} - \overline{a_1} = 0 \quad (A14)$$

For r=2, $\delta_2$ is equal to:

$$\delta_2 = [\overline{a_1 \cdot a_3} - (a^{-2}_2 + \sigma_a^2)] - [a_1"a_3" - a_2"^2] = -\sigma_a^2 \quad (A15)$$

For r=3, $\delta_3$ is equal to:

$$\delta_3 = -\sigma_a^2(\overline{a_1} + 3\overline{a_3} + \overline{a_5}) \quad (A16)$$

Further calculations for $\delta$ can be more readily obtained directly when r exceeds 3.

To calculate the values of the standard deviation of the determinant, $\sigma_{det\ I}$, for r=1, 2 and 3, the following formulas can be used: For r=1:

$$\sigma_{det1}^2 = \overline{a_1^2} - a_a^{-2} = \sigma_a^2 \quad (A17)$$

For r=2:

$$\sigma_{det2}^2 = \sigma_a^2(a_1^{-2} + 4a_2^{-2} + a_3^{-2}) + 3\sigma_a^4 \quad (A18)$$

For r=3:

$$\sigma_{det3}^2 = \sigma_a^2(\overline{a_1}^2\overline{a_2}^2 + \overline{a_1}^2\overline{a_5}^2 + 5\overline{a_2}^2\overline{a_5}^2 + 4\overline{a_1 a_3 a_4 a_5} - 2\overline{a_2 a_4}^2 \overline{a_5} - \quad (A19)$$

$$2\overline{a_1 a_2}^3 - \overline{a_1 a_2 a_5}^2 + 4\overline{a_2}^2\overline{a_3}^2 + 4\overline{a_2}^2\overline{a_4}^2 + 4\overline{a_3}^2\overline{a_4}^2 -$$

$$12\overline{a_2 a_3 a_4} - 8\overline{a_1 a_2 a_3 a_4} - 8\overline{a_2 a_3 a_4 a_5} +$$

$$9\overline{a_3}^4 + \overline{a_4}^4 + 4\overline{a_1}^2\overline{a_4}^2 + \overline{a_2}^4) +$$

$$\sigma_a^4(3\overline{a_1}^2 + 11\overline{a_2}^2 + 3\overline{a_5}^2 - 2\overline{a_2 a_5} + 6\overline{a_1 a_2} +$$

$$40\overline{a_3}^2 + 10\overline{a_3}^2 + 10\overline{a_4}^2 - 12\overline{a_2 a_4}) + 26\sigma_a^6$$

The expressions for calculating $\sigma_{det\ I}$ become increasingly complex as r exceeds 3. If r exceeds 3 it is more practical to calculate $\sigma_{det\ I}$ directly.

Those skilled in the art will readily devise different embodiments of the invention which do not depart from the spirit of the invention disclosed herein. Accordingly, the invention should be limited in scope only by the attached claims:

What is claimed is:

1. A method of determining a number of exponential decay modes in spin echo amplitude signals from a nuclear magnetic resonance well logging instrument, comprising:

dividing a time interval occurring between initiation and termination of measurement of said spin echo amplitude signals into an odd number, 2r−1, of equal length segments, wherein r is a positive integer;

calculating integrals of said spin echo amplitude signals with respect to time for each of said segments;

calculating best fit functions of said spin echo amplitude signals and integrals with respect to time, of apparent amplitudes of said best fit functions calculated for each time at which said spin echo amplitude signals were measured;

arranging said integrals of said spin echo amplitude signals and said integrals of said apparent amplitudes for each of said segments into respective symmetric matrices each having dimensions r×r;

calculating a norm and a standard deviation of a determinant of said matrix of said integrals of said spin echo amplitude signals; and determining whether said norm is less than or equal to a selected confidence factor multiplied by said standard deviation of the determinant of said matrix, whereupon said number of exponential decay modes is equal to r−1.

2. The method as defined in claim 1 further comprising:

increasing the value of r by one; and repeating said steps of dividing said time interval, calculating said integrals of said amplitude, calculating said best fit functions, calculating said apparent amplitudes, said integrals of said apparent amplitudes, calculating said norm and said standard deviation, arranging said integrals into matrices and determining whether said mean value is less than or equal to said standard deviation multiplied by said confidence factor, until said mean value is less than or equal to said standard deviation multiplied by said confidence factor, whereupon said number of modes is equal to r−1.

3. The method as defined in claim 1 further comprising:

a) dividing said time interval into a first subinterval ending with said termination and beginning with a first selected time prior to said termination;

b) subdividing said first subinterval into three equal length subsegments;

c) calculating integrals with respect to time of said spin echo amplitudes for each of said subsegments;

d) calculating best fit functions of said amplitudes and apparent amplitudes of said best fit functions at each time at which said spin echo amplitudes were measured;

e) calculating integrals with respect to time of said apparent amplitudes for each of said subsegments;

f) arranging said integrals of said amplitudes and said integrals of said apparent amplitudes into respective 2×2 symmetric matrices;

g) determining whether the norm of the determinant of said matrix is less than or equal to a selected confidence factor multiplied by the standard deviation of the determinant of said matrix, whereupon the number of exponential decay modes in said subinterval is equal to one;

h) adjusting said first selected time closer to said initiation and repeating said steps a through f until said mean value of said norm is not less than said confidence factor multiplied by said determinant;

i) adjusting said first selected time incrementally closer to said termination, and calculating a first optimal exponential function for said spin echo amplitudes within said first subinterval;

j) subtracting values of said optimal exponential function from all of said spin echo amplitudes; and k) dividing said time interval into a second subinterval beginning with a second selected time and ending with said incrementally adjusted first selected time;

l) subdividing said second subinterval into three equal length subsegments;

m) repeating said steps b through h, and calculating a second optimal exponential decay function for said spin echo amplitude in said second subsegment; and generating a new subinterval ending with said second incrementally adjusted selected time, and repeating said steps a through m until the number of said optimal exponential functions is equal to said number of exponential decay modes.

4. The method as defined in claim 3 further comprising adjusting relative amplitudes and decay times of said optimal exponential decay functions to minimize difference between a sum of said optimal exponential decay functions and said spin echo amplitudes.

5. The method as defined in claim 4 wherein said step of minimizing said difference includes the Levenberg-Marquardt algorithm.

6. A method for determining the individual relaxation times and relative amplitudes of each exponential decay mode within measurements of spin echo amplitude made by a nuclear magnetic resonance well logging instrument, comprising:

a) dividing a time interval from initiation of measurement of said spin echo amplitudes to termination of measurement of said amplitudes into a first subinterval ending with said termination and beginning with a first selected time prior to said termination;

b) subdividing said first subinterval into three equal length subsegments;

c) calculating integrals with respect to time of said spin echo amplitudes for each of said subsegments;

d) calculating best fit functions in each of said subsegments of said amplitudes and calculating apparent amplitudes of said best fit functions at each time corresponding to a time at which said spin echo amplitudes were measured;

e) calculating integrals with respect to time of said apparent amplitudes for each of said subsegments;

f) arranging said integrals of said spin echo amplitudes and said integrals of said apparent amplitudes into 2×2 symmetric matrices;

g) determining whether the norm of the determinant of said matrix of said spin echo amplitudes is less than or equal to a selected confidence factor multiplied by the standard deviation of the determinant of said matrix of said integrals of said spin echo amplitudes, wherein the number of exponential decay modes in said subinterval is equal to one;

h) adjusting said first selected time closer to said initiation and repeating said steps a through f until said mean value is not less than said confidence factor multiplied by said determinant;

i) adjusting said first selected time incrementally closer to said termination, and calculating a first optimal exponential function for said spin echo amplitudes within said first subinterval;

j) subtracting values of said optimal exponential function from all of said spin echo amplitudes; and k) dividing said time interval into a second subinterval beginning with a second selected time and ending with said incrementally adjusted first selected time;

l) subdividing said second subinterval into three equal length subsegments;

m) repeating said steps b through h, and calculating a second optimal exponential decay function for said spin echo amplitude in said second subsegment; and generating a new subinterval ending with said second incrementally adjusted selected time, and repeating said steps a through m until the decay modes over the whole of said time interval have been calculated.

7. The method as defined in claim 6 further comprising adjusting relative amplitudes and decay times of said optimal exponential decay functions to minimize difference between a sum of said optimal exponential decay functions and said spin echo amplitudes.

8. The method as defined in claim 7 wherein said step of minimizing said difference includes the Levenberg-Marquardt algorithm.

* * * * *